Sept. 19, 1961  J. D. ROY  3,000,536

DEVICE FOR HANDLING AND PROTECTING MILK CARTONS

Filed June 5, 1959

INVENTOR.

*J. D. Roy*

United States Patent Office 3,000,536
Patented Sept. 19, 1961

3,000,536
DEVICE FOR HANDLING AND PROTECTING MILK CARTONS
J. D. Roy, R.R. 8, Box 183, Decatur, Ill., assignor of one-tenth part to Gadget-Of-The-Month Club, Inc., North Hollywood, Calif., a corporation of California
Filed June 5, 1959, Ser. No. 818,365
2 Claims. (Cl. 220—85)

This invention relates to material handling apparatus and more particularly to a device for handling and protecting milk cartons.

It is an object of the present invention to provide a carrier for flexible walled milk cartons that will enable the contents to be emptied therefrom without damaging the side walls and without straining the hand.

Another object of the present invention is to provide an easily handled carrier having a collapsible handle for pouring milk from flexible walled milk cartons that is re-useable and which can be readily applied to any prismatic type carton.

Other objects of the invention are to provide a device for handling and protecting milk cartons bearing the above objects in mind which is of simple construction, has a minimum number of parts, is inexpensive to manufacture and efficient in operation.

For other objects and for a better understanding of the invention, reference may be had to the following detailed description taken in conjunction with the accompanying drawing, in which.

Figure 1:
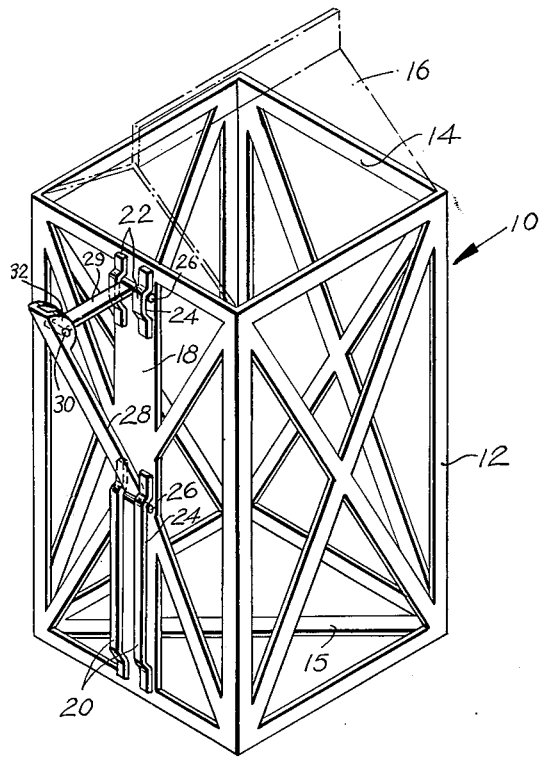
FIGURE 1 is a perspective view of a handling device made in accordance with the present invention in actual use.
Figure 2:
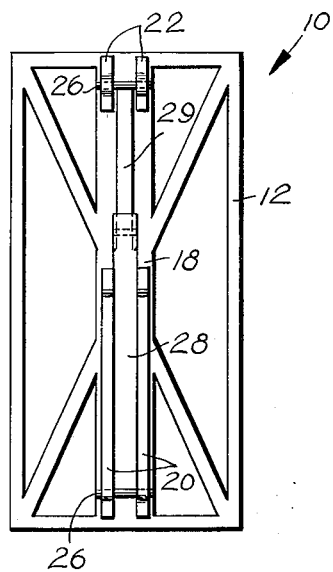
FIGURE 2 is a rear elevational view of the device shown in FIGURE 1 with the handle in a folded position.
Figure 3:
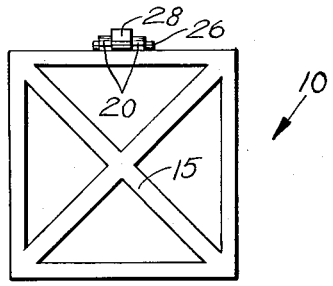
FIGURE 3 is a bottom plan view of the device shown in FIGURE 2.

Referring now more in detail to the drawing, a carrier 10 for prismatic type milk cartons 16 is shown to include a lattice type walled enclosure 12 having a bottom wall 15 and opening toward the top thereof for slidably receiving the milk carton 16 within the defined compartment 14.

One rear wall of the carrier is provided with a wider web 18 upon which two sets of slide brackets 20, 22 are secured in aligned longitudinally spaced apart relationship. The lower set of brackets 20 define a longitudinal slideway 24 within which a trunnion pin 26 extends, such trunnion pin 26 being secured to the outer free end of a handle bar 28 that is pivotally connected at its opposite end by means of a pin 30 to an associated end of a smaller handle bar 29. The pivot pin 30 extends through a pair of spaced apart parallel ears 32 of the longer bar 28, while the opposite free end of the shorter bar 29 is provided with a trunnion pin 26 that is slidably received within the slideway 24 of the shorter brackets 22.

It will now be recognized that in the folded position of the handle bars 28, 29, the lowermost trunnion pin 26 extends toward the bottom of the longer brackets 20, while the trunnion pin 26 of the shorter handle bar 29 extends upwardly toward the top of the shorter bracket 22. However, the handle bars may be rotated out of the flat engaged position adjacent to the rear wall of the carrier and into the position shown in FIGURE 1, in which may be conveniently grasped by the hand for carrying the milk carton 16 and pouring the contents outwardly therefrom.

While various changes may be made in the detail construction, it shall be understood that such changes shall be within the spirit and scope of the present invention as defined by the appended claims.

What I claim as new and desire to protect by Letters Patent of the United States is:

1. A milk carton carrier comprising, in combination, an upwardly opening walled receptacle of generally hollow prismatic shape for slidably receiving and supporting a generally similarly shaped milk carton therewithin, said receptacle including lattice-type walls and having a bottom wall with openings therethrough, said receptacle having at least one side-wall thereof provided with a web, handle supporting brackets carried by said web and including a pair of vertically-spaced-apart sets of slide brackets secured in longitudinally aligned and spaced-apart relationship upon said web, and a foldable handle assembly supported upon said brackets for selective movement between a normally closed position lying immediately adjacent to said web and an outwardly projecting grasping position protruding outwardly therefrom, said foldable handle assembly including a pair of pivotally connected handle-bars, with each handle-bar having a remote end provided with a trunnion pin rotatably and slidably supported within each of said set of brackets for relative rotative and sliding longitudinal movement.

2. The combination according to claim 1, wherein one of said handle bars is longer than the other, and said set of brackets slidably receiving the trunnion carried by said longer one of said bars being longer than the other said set of brackets for slidable engagement with the other one of said trunnions carried by the shorter bar.

References Cited in the file of this patent
UNITED STATES PATENTS

| | | |
|---|---|---|
| 1,316,402 | Wellington | Sept. 16, 1919 |
| 2,775,373 | Coralline | Dec. 25, 1956 |

FOREIGN PATENTS

| | | |
|---|---|---|
| 538,051 | Belgium | May 31, 1955 |